G. AMBORN.
BORING BAR OR TOOL HOLDER.
APPLICATION FILED OCT. 20, 1913.
1,201,673.
Patented Oct. 17, 1916.
2 SHEETS—SHEET 1.
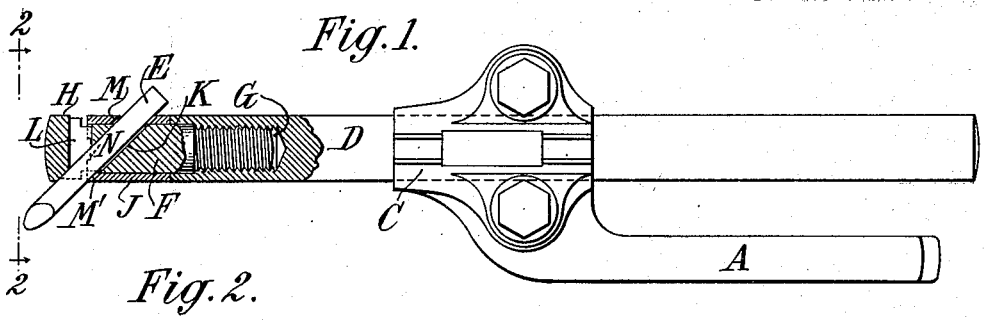
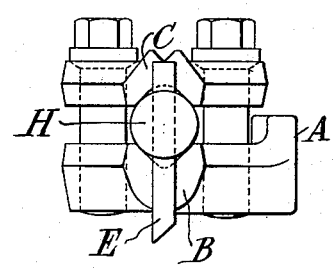
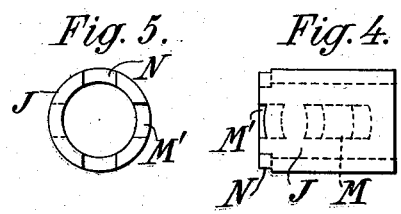
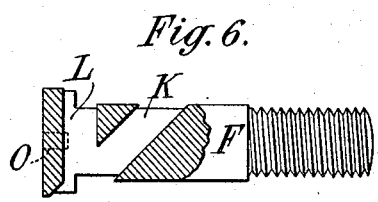
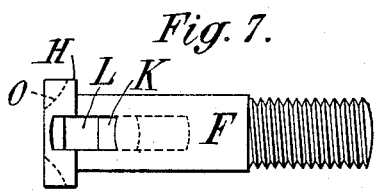
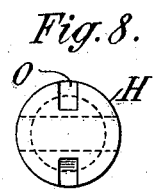
WITNESSES:
René Bruine
J. J. Wallace
INVENTOR :
George Amborn
By Attorneys,
Fraser Turker & Myers G. AMBORN.
BORING BAR OR TOOL HOLDER.
APPLICATION FILED OCT. 20, 1913.
1,201,673.
Patented Oct. 17, 1916.
2 SHEETS—SHEET 2.
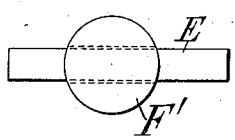
Fig. 11.
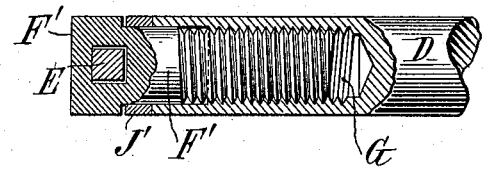
Fig. 9.
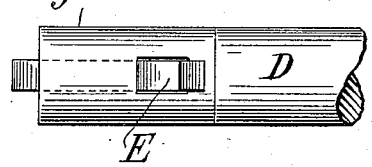
Fig. 13.
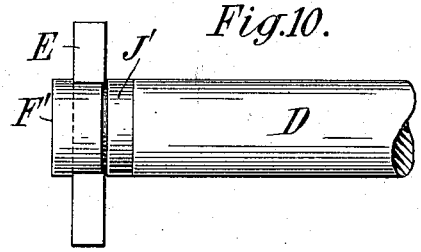
Fig. 10.
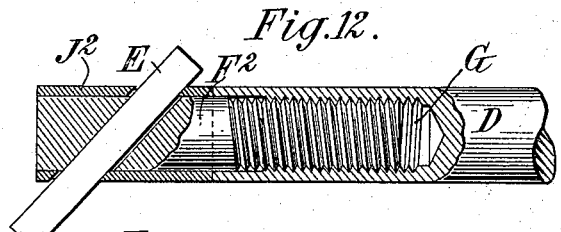
Fig. 12.
Fig. 14.
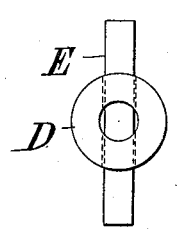
Fig. 16.
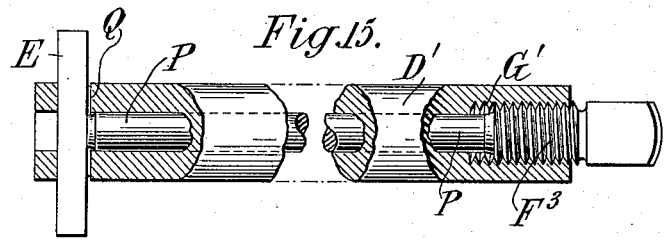
Fig. 15.
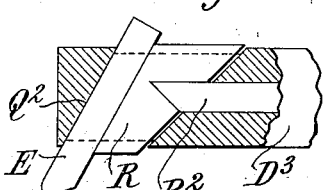
Fig. 18.
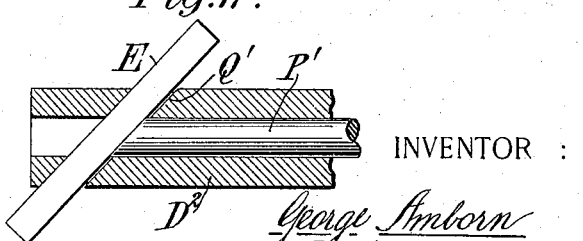
Fig. 17.
INVENTOR:
George Amborn
By Attorneys,
WITNESSES:

UNITED STATES PATENT OFFICE.

GEORGE AMBORN, OF CHAPINVILLE, CONNECTICUT, ASSIGNOR TO J. H. WILLIAMS & CO., OF BROOKLYN, NEW YORK, A CORPORATION OF NEW YORK.

BORING-BAR OR TOOL-HOLDER.

1,201,673.  Specification of Letters Patent.  Patented Oct. 17, 1916.

Application filed October 20, 1913. Serial No. 796,282.

*To all whom it may concern:*

Be it known that I, GEORGE AMBORN, a citizen of the United States, residing at Chapinville, in the county of Litchfield and State of Connecticut, have invented certain new and useful Improvements in Boring-Bars or Tool-Holders, of which the following is a specification.

This invention aims to provide an improved bar or holder for cutting tools, especially designed for boring. The bar may be used with various styles of clamping apparatus for supporting it on the post of the lathe, and is especially designed to be used in connection with the clamping device of my pending application No. 677,158, filed February 12, 1912; this application being in part a continuation of the aforesaid application, and in part a continuation of my application No. 732,823 filed November 22, 1912.

The invention aims to provide a boring bar having certain advantages in strength and in simplicity of construction and use as compared with those heretofore in use.

In the preferred embodiment of my invention I provide a bar which is tapped to form an internally threaded socket into which screws a bolt or stud, and this bolt or stud is formed with a plurality of slots or recesses adapted to receive the cutting tool, or a plurality of studs is provided having differently arranged slots. These slots or recesses are arranged at appropriate angles to the boring bar, usually so that the tool is held at a right angle in one case and at an angle of about 135° in the other case. The tool is clamped in place by the use of a sleeve surrounding the bolt or stud and preferably having a slot or slots coinciding with the slot or slots in the bolt, the sleeve being adapted to bind against the cutter when the stud or bolt is screwed inwardly in the bar.

The invention also includes certain other improvements which will be hereinafter described.

The accompanying drawings illustrate embodiments of the invention.

Figure 1 is a plan of a boring bar with the cutting tool fastened in place therein, the end of the bar being shown in section, and the bar being mounted in a clamp. Fig. 2 is an end view of Fig. 1. Figs. 3, 4 and 5 are respectively a vertical section, an under side plan, and an end view of the sleeve forming part of the bar of Fig. 1. Figs. 6, 7 and 8 are corresponding views of the stud forming part of the bar of Fig. 1. Figs. 9, 10 and 11 are respectively a vertical sectional view, a plan and an end view of a slightly different style of bar. Figs. 12, 13 and 14 are similar views of devices for holding the cutter at an angle, working on the same principle as the device of Fig. 9. Fig. 15 is a longitudinal section, and Fig. 16 an end view of a simplified construction, using a cutter arranged at right angles to the bar. Figs. 17 and 18 are vertical sections of similar constructions using cutters at an oblique angle to the bar.

Referring to the embodiments of the invention illustrated the bar D is mounted adjustably in a clamping device comprising a shank A adapted for attachment to the lathe post, a grooved lower member B and a grooved cap C bolted on the member B and clamping the bar at any desired point in its length in the manner shown in Fig. 2 and explained in detail in my aforesaid application. The bar D is preferably a solid round bar as shown in Figs. 1 to 14, or it may be made hollow, as in Figs. 15 to 18 at a less cost than the solid style and where only a straight cutter or only an angle cutter is wanted in the same bar. With my solid bar a change can be effected from a straight cutter to an angle cutter without withdrawing the bar from the clamp. In the hollow bar construction illustrated the bar itself must be changed in order to change from a straight cutter to an angle cutter, or vice versa. Both styles of bar, however, are straight, and of the same external cross-section from end to end so as to permit their adjustment longitudinally in the clamp.

For attachment of the cutter the end of the boring bar (the forward end in the solid bar and the rear end in the hollow bar) is tapped to form an internally threaded socket into which screws a stud for the purpose of fastening the cutter.

Referring now particularly to Figs. 1 to 8, a cutter E is carried in a slot in a stud F which has a threaded stem screwing into the tapped or internally threaded socket G at the forward end of the bar. By providing an internally threaded socket G the bar is strengthened at the point of greatest strain as compared with prior bars which have been reduced and threaded on the outside. The stud F has an enlarged head H, and a sleeve J is located on the stud in a position to bear against the end of the holder D and to form an abutment against which the cutter is forced by the stud. The cutter E passes through the stud F and through or across the outer end of the sleeve J, so that as the stud is screwed into the holder it bears against the part of the cutter lying within the sleeve and presses the adjacent portions of the cutter against the sleeve and forces the sleeve to a bearing against the end of the holder D. The sleeve fits the stud with a good, sliding fit so that the bearings of the stud and the sleeve respectively on opposite sides of the cutter do not introduce any substantial bending strain on the cutter, the stud being in engagement with the tool practically or nearly in line with the points at which the tool engages the sleeve.

The stud F is provided with two openings, one K, extending obliquely, and the other L, extending at a right angle or substantially so across the stud, the two openings being practically in the same plane, as indicated in Fig. 7. The sleeve J is adapted to engage the rear faces of tools lying in either of the openings K and L through the bolt. Referring to Fig. 3 the oblique opening through the sleeve comprises the hole M at one side and a notch M′ diametrically opposite and at the forward edge of the sleeve. For use in connection with the right-angled opening L of the stud the sleeve is provided with a pair of identical notches N at diametrically opposite points in its forward edge. These notches are not essential, as the tool might bear against a straight forward edge of the sleeve as in Figs. 9 and 10; but the notches N are useful as guides to keep the straight tool from being accidentally brought into engagement with the oblique notch M′. The line of the notches N is at right angles to that of the openings M M′. Fig. 1 shows the oblique openings in use with an angle cutter in place. In order to use the tool for a right-angled cutter without withdrawing the bar from the clamp and without using any other fastening means, it is only necessary to unscrew the stud slightly, withdraw the cutter, give the sleeve J a quarter turn to bring the notches N into line with the opening L through the stud, insert the cutter through the notches N and opening L and screw the stud in again. The head of the stud may be formed with notches O (Fig. 8) or otherwise shaped for engagement by a wrench to screw the stud into the bar.

The devices of Figs. 9 to 14 operate similarly to those above described; the only substantial difference being that for a right-angled cutter, as shown in Figs. 9, 10 and 11, a stud F′ is used with a single opening through it at a right angle and a corresponding sleeve J′, and that for an angle cutter a stud F² is used with an oblique opening and a sleeve J² with a corresponding opening. In the construction of these figures, as in the construction of Figs. 1 to 8, the operation of fastening the cutter takes place always at the forward end of the bar and there is no necessity of disturbing the adjustment of the bar in the clamp when a change is to be made from a right-angle cutter to an oblique cutter.

With the construction of Figs. 15 to 18, however, the forward end of the bar constitutes the abutment against which the cutter is forced by the stud, and the bar itself must be changed when the angle of the cutter is to be changed. Each of these bars (as shown in Fig. 15) has an internally threaded socket G′ at its rear end into which screws a stud F³ and pushes forward a rod P which passes through the hollow bar and bears at its forward end against the cutter E, the latter passing through a suitably directed opening in the forward end of the bar itself; thus for a right-angled cutter an opening Q extending straight across the bar may be used (Fig. 15); or for an oblique cutter the bar D², Fig. 17, may be used having an oblique opening Q′ across its end; a rod P′ with a properly shaped forward end being substituted for the square ended rod P of Fig. 15. Or a bar D³ (Fig. 18) may be used with a wide opening Q² at the desired angle, said opening receiving not only the cutter E but also a fastening block R which bears against the entire rear face of the cutter so as to avoid bending strains thereon, and which in turn is held by the rod P² pressed forward from the rear end, as in Figs. 15 and 17.

I claim as my invention:—

1. A boring bar comprising a rod of uniform external cross-section from end to end so as to permit it to be clamped at desired points in its length, said bar being socketed and internally threaded at one end, and means for fastening a cutter in the bar including an abutment and a stud screwing into said internally threaded socket and forcing the cutter against said abutment.

2. A boring bar the forward end of which is socketed and interiorly threaded, a stud screwing into said socket and having an opening to receive a cutter, and a sleeve surrounding said stud and bearing against the end of the bar, said stud forcing the cutter against a part of said sleeve to hold the cutter in place.

3. A boring bar and a single holding means for holding a cutter therein, said holding means including a bolt having a plurality of openings therethrough one at a right angle and the other at an oblique angle to the bar, said openings being separated from each other through at least a portion of their lengths so that the walls of the respective openings will alone determine the angular position of the cutter.

4. A boring bar in combination with a stud having a threaded connection with the bar, and a sleeve on said stud adapted to bear gainst the bar, said stud having a plurality of openings therethrough, one at a right angle and the other at an oblique angle to the bar, said openings being separated from each other through at least a portion of their lengths so that the walls of the respective openings will alone determine the angular position of the cutter, and said sleeve being adapted for engagement by a cutter in either of said openings and to clamp it in place when the stud and bar are screwed together.

5. A boring bar in combination with a stud having a threaded connection with the bar, and a sleeve on said stud adapted to bear against the bar, said stud having a plurality of openings therethrough, one at a right angle and the other at an oblique angle to the bar, said openings being separated from each other through at least a portion of their lengths so that the walls of the respective openings will alone determine the angular position of the cutter, and said sleeve having similar openings for engaging the cutter and clamping it in place when the stud and bar are screwed together, the openings in the stud lying in the same plane and the openings in the sleeve lying in planes at an angle to each other so that, by turning the sleeve to the proper angle, the device is adapted to change from a right-angled cutter to an oblique cutter.

6. The combination of a boring bar, a stud having a plurality of openings adapted to receive the tool, said stud and said bar having interengaging means, and a sleeve surrounding said stud and abutting said bar and adapted to clamp said tool against said stud.

7. The combination of a boring bar, a stud having a plurality of openings adapted to receive the tool, said stud and said bar having interengaging means, and a sleeve surrounding said stud and abutting said bar and adapted to clamp said tool against said stud, and said sleeve having openings adapted to receive said tool.

8. The combination of a boring bar, a stud, said stud and said bar having interengaging means and said stud having openings K and L therein for holding a cutter at different angles relative to the bar and a sleeve surrounding said stud and having a slot M adapted to register with said opening K.

9. The combination of a boring bar, a stud, said stud and said bar having interengaging means and said stud having openings K and L therein for holding a cutter at different angles relative to the bar, and a sleeve surrounding said stud and having a slot M and a notch M' adapted to register with said opening K and notches N adapted to register with said opening L.

In witness whereof, I have hereunto signed my name in the presence of two subscribing witnesses.

GEORGE AMBORN.

Witnesses:
WILLIAM G. COLE,
CHAS. E. AHRENSFIELD.

Copies of this patent may be obtained for five cents each, by addressing the "Commissioner of Patents, Washington, D. C."